Oct. 4, 1955 — G. L. ASPDEN ET AL — 2,719,471
CAMERA CARRIER
Filed Jan. 12, 1953
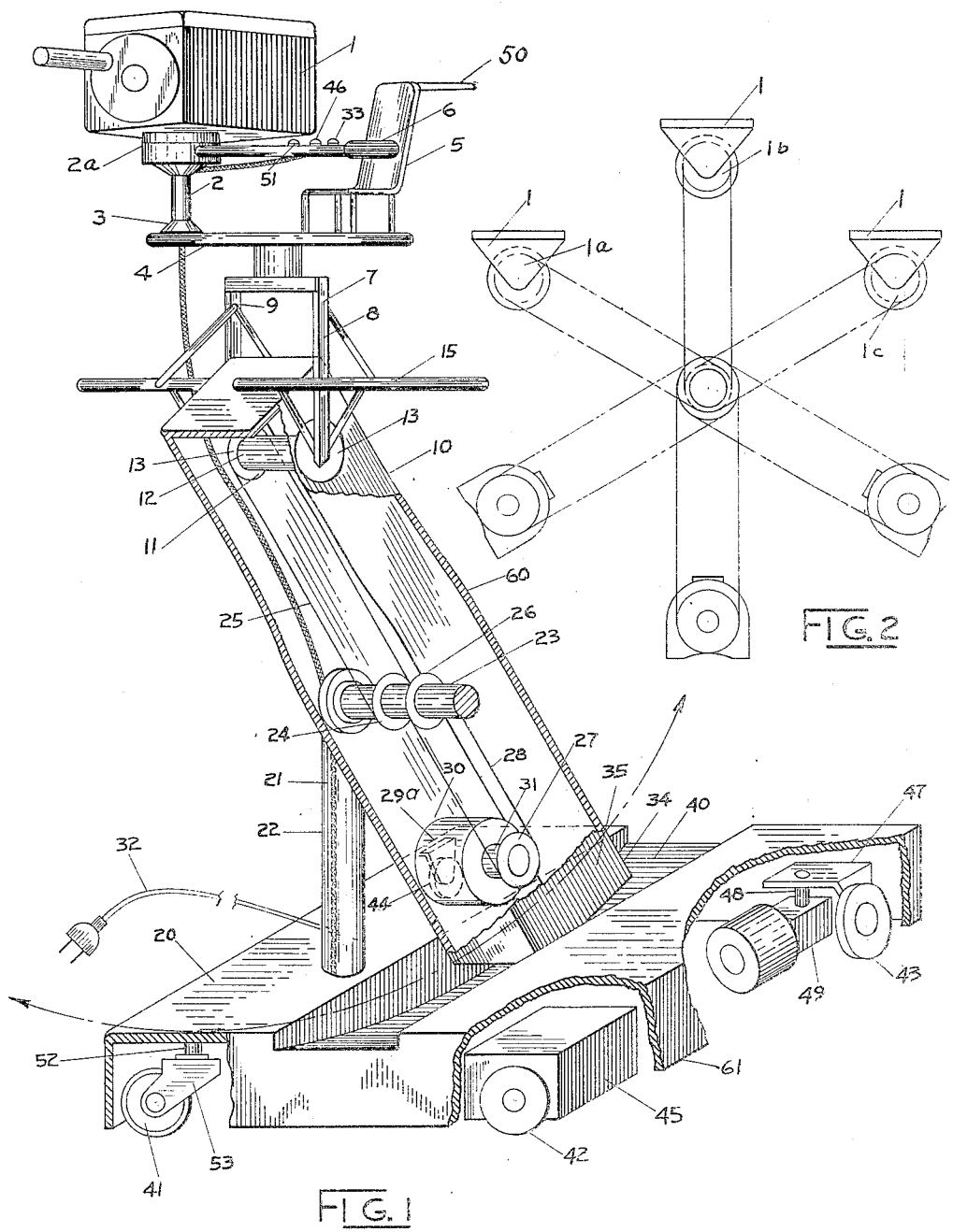
Inventor
GERALD L. ASPDEN
AND
ROBERT V. BERLIN
By Charles L. Lovercheck
Attorney

United States Patent Office 2,719,471
Patented Oct. 4, 1955

2,719,471
CAMERA CARRIER
Gerald L. Aspden and Robert V. Berlin, Erie, Pa.

Application January 12, 1953, Serial No. 330,876

9 Claims. (Cl. 95—86)

Our invention relates to camera supports and more particularly to means for supporting television and movie cameras during the time that a movie scene or television program is being viewed by the camera.

In television studios, it is frequently necessary in order to provide a proper continuity of the story being photographed to view the scene in such manner that the impression is given to the audience that they are moving away from a particular scene. It is also often necessary to view the scene from different angles of both elevation and azimuth.

In camera supports made according to previous design, the camera has been supported on a boom which is movable to an angle of less than ninety degrees, the boom being supported on a platform which is moved manually by assistants on the floor. The limited movability of the camera imposes considerable limitations on the versatility of the equipment and the movement of the camera carrying means on the floor becomes very cumbersome and requires the services of several attendants.

It is, accordingly, an object of our invention to provide a camera supporting means which has a boom pivotally mounted on a supporting platform and the boom is movable through a vertical angle of substantially two hundred seventy degrees or more.

It is another object of our invention to provide a platform for mounting a camera support wherein the platform can be driven about the floor by power means controlled by the camera operator.

Another object of our invention is to provide a camera carrier having a boom enclosing the machinery and driving means therein in a soundproof case.

Another object of our invention is to provide a camera supporting means for supporting a camera on a boom wherein the camera will be held in a level position regardless of the angle of elevation of the boom and wherein the camera is held level by a novel type of parallel motion mechanism.

Another object of our invention is to provide a novel type of driving and steering mechanism for a camera supporting means.

With the above and other objects in view, the present invention consists of the combination and arrangement of parts hereinafter more fully described, illustrated in the accompanying drawing, and more particularly pointed out in the appended claims, it being understood that changes may be made in the form, size, proportions, and minor details of construction without departing from the spirit or sacrificing any of the advantages of the invention.

In the drawing:

Fig. 1 shows a perspective view of a novel camera supporting device according to the invention and with certain parts broken away to disclose the operating mechanism more distinctly; and Fig. 2 discloses a schematic view of our camera supporting means showing the camera disposed in various angles of elevation.

Now with more specific reference to the drawing, Fig. 1 shows a camera 1 supported on a pedestal 2 and pivotally mounted on the pedestal 2 at 3. The pedestal 2 is supported on platform 4 which incorporates an operator's seat 5 and a bracket 2a. The horizontal angle of the camera is controlled manually by the operator by means of handle 6. The camera 1 and platform 4 are supported on U-shaped bracket 7 having legs 8 and 9 fixed to shaft 12 which is pivotally mounted on boom 10. Shaft 12 is journalled in bearings 11 on the boom 10 and sprocket wheels 13 are fixed to the ends of shaft 12 by welding, brazing, or other mounting means. The boom 10 is swingably mounted on standard 21 which is supported on platform 20 and has a vertically disposed member 22 and a horizontally disposed member 23.

The sprockets 24 are welded or by other means attached to the horizontal member 23 and one sprocket 24 thereon is operably connected to the sprocket 13 by means of chain 25. Sprocket 26 is operably connected to sprocket 27 by chain 28. Electric motor 29 is fixedly mounted on boom 10 by means of mounting plate 30 or other mounting means and motor 29 drives sprocket 27 through shaft 31.

Power is supplied to motor 29 from a fixed power supply through a lead wire 32 which may be plugged into a convenient outlet and provided with a suitable length of cord to allow the boom and carrying means to have the proper latitude of movability about a studio floor. The motor 29 is connected through suitable circuits to a reversing switch 33 mounted on the handle 6 whereby the operator can cause motor 29 to rotate in either direction in order to either raise or lower the boom 10.

When the motor 29 drives the sprocket 27 in a clockwise direction, since the sprocket 26 is fixed to the horizontal member 23 and, therefore, cannot rotate, the motor 29 itself will rotate with regard to a fixed point in space and the boom will thereby be carried around the horizontal member 23 in a counterclockwise direction. Since the sprocket 24 is fixed to the horizontal member 23, it cannot move so that the movement of the boom around the horizontal member 23 will swing the shaft 12 around member 23 which will drive the sprocket 13 through the chain 25 in proportion to the movement of the boom. The camera 1 will thereby be held in a horizontal position with regard to the horizontal member 23 whereby said camera will move in translation.

A channel 40 is provided in the support member 20 through which the lower end 34 of the boom 10 can move in order for the boom to move through an angle of more than two hundred degrees from one extreme of a horizontal position to the other around the horizontal member 23. The boom 10 is provided with a counterweight 35 on the lower end of the boom which tends to counterbalance the weight of the camera 1 and the operator when seated on the seat 5.

Working parts of the boom are enclosed with soundproof material 60 and the platform is covered with soundproof material 61.

The platform 20 is mounted on wheels 41, 42, 43, and 44. The wheel 42 is driven by motor 45 and suitable reduction gears which are fixedly mounted to the platform 20. The motor is connected by suitable circuits to a reversing switch 46 mounted on the handle 6 whereby the operator seated on the seat 5 can cause the motor 45 to drive in either a counterclockwise or clockwise direction to move the platform 20 in any desired direction.

The wheel 43 is mounted on bracket 47 which is pivotally mounted by means of shaft 48 through suitable reduction gears onto motor 49. Motor 49 is fixedly mounted on the platform 20. Motor 49 is connected to suitable circuits through a reversing switch 51 on handle 6. By causing the motor 49 to operate in either a counterclockwise or a clockwise direction, the bracket 47 is steeringly rotated on shaft 48 to steer the platform 20 in any desired direction when it is being driven about the floor by motor 45.

The wheel 41 is pivotally mounted on platform 20 by means of shaft 52 which is fixed to bracket 53 and bracket 53 pivotally supports the wheel 41. The wheel 41, in other words, is mounted on the platform 20 in the manner of a caster. Wheel 44 is mounted on platform 20 by bracket 29a.

In Fig. 2, the camera 1 is shown in various positions of elevation to better illustrate the operation of the drive mechanism. In the position 1a, the camera is shown in a counterclockwise position; in position 1b, it is shown in a vertical position; and in position 1c, it is shown in the clockwise position. It will be noted that the camera is held horizontal in each of these positions and is designed to swing considerably farther than shown in Fig. 2.

During operation, the operator sits on seat 5 and rests his feet on platform 56. He presses the button 33 to cause the motor 29 to drive the boom 10 into any desired position of elevation. The motor 49 is driven in either direction to rotate shaft 48 to steer the platform and reversible motor 45 is operated to drive the platform over the floor.

The auxiliary seat 50 is provided. At times, it becomes important for the camera operator to be elevated above the camera in order to get better visibility, especially when the camera is lowered near the floor. In this event, the operator can sit on seat 50 and rest his feet on the platform 4.

In the foregoing specification, we have set forth the invention in its preferred practical forms but we are aware that the structure shown is capable of modification within a range of equivalents without departing from the invention which is to be understood is broadly novel as is commensurate with the appended claims.

What we claim is:

1. A camera support comprising a portable platform, a boom swingably mounted on the platform, a camera and operator supporting means on the boom on said platform operatively connected to said driving means, means to drive the platform, said means comprising a motor, a control for said motor mounted on the camera support means, and steering means for the platform mounted on the camera support means whereby said steering means and said means to drive said camera are adapted to be operated by an operator on said operator support.

2. A camera support comprising a platform, a camera supporting boom mounted on said platform, and driving and steering means for said platform, said driving and steering means comprising four floor engaging wheels supporting said platform, including a caster wheel, a wheel driven by a motor providing propelling means for said platform, and a wheel rotatable on a horizontal axis supported on a vertically disposed shaft, and a motor attached to said shaft to rotate said axis whereby said wheel is steered.

3. The camera support recited in claim 2 wherein the driving motor is controlled by a means mounted on the boom and the steering motor is controlled by a control also mounted on the boom.

4. A camera support comprising a boom, a platform for mounting the boom, a camera supporting bracket on said boom, and a parallel motion mechanism on said boom, said parallel motion mechanism comprising a motor mounted on the boom, a sprocket mounted on the motor, a first and a second sprocket fixed to said platform, a sprocket fixed to said bracket, a chain operably connected to said bracket sprocket and said first sprocket, and another chain operably connected to said motor sprocket and said second sprocket whereby rotating said motor sprocket causes said boom to swing on said platform and causes said camera bracket to move in translation.

5. The camera support recited in claim 4 wherein an operator's seat is also fixed to said bracket.

6. A parallel motion mechanism comprising a support member, a boom swingably mounted on said support, a first wheel pivotally mounted on said boom, a second and a third wheel fixed to said support member, a fourth wheel pivotally mounted on said boom, means to rotate said fourth wheel, driving means between said first and second wheels, driving means operably connecting said third and fourth wheels whereby when said fourth wheel is rotated, said boom swings and said first member moves in a manner that a given line on said member is substantially parallel to its original position throughout movement of said boom, and means to support a camera on said boom.

7. A camera support comprising a portable platform, a boom swingably mounted on the platform, a camera and operator supporting means on the boom, means to drive the platform, said means comprising a motor, a control for said motor mounted on the camera support means, and a seat mounted on said platform, said seat having a back and an auxiliary seat attached to said seat back, said camera being movable with respect to said seat whereby an operator can sit on said auxiliary seat and rest his feet upon said seat to obtain visibility over said camera when said camera is directed downward.

8. A camera support comprising a platform, a vertically disposed member supported on said platform, a boom swingably mounted on said vertically disposed member at an intermediate point on said boom, and a pedestal for supporting a camera mounted on one end of the boom, said boom being swingable through an angle of greater than ninety degrees on both sides of a vertical position, the end of said boom opposite said one end being provided with a counterbalance means and a parallel motion means adapted to hold said camera pedestal in level position.

9. A camera support comprising a platform, a support member extending upward from said platform and terminating in a transversely disposed portion, a boom swingably mounted on said transverse portion, a motor on said boom, a camera platform supported on said boom on a transversely disposed pivotal member, a first sprocket on said pivotal member, a second sprocket fixed to said transversely disposed portion of said upwardly extending member, said first and said second sprockets being operatively connected by a chain, and a motor mounted on said boom having a sprocket thereon operatively connected by a chain to a sprocket on said transversely disposed portion whereby said motor is adapted to rotate to drive said chain thereon and thereby swing said boom about said transversely extending support member while said first and second sprockets hold said camera platform in parallel relation.

References Cited in the file of this patent

UNITED STATES PATENTS

| 2,073,998 | Raby | Mar. 16, 1937 |
| 2,472,944 | Furer | June 14, 1949 |

FOREIGN PATENTS

| 752,658 | France | July 24, 1933 |
| 339,368 | Great Britain | Dec. 11, 1930 |